United States Patent
Lin et al.

(10) Patent No.: US 7,680,181 B1
(45) Date of Patent: Mar. 16, 2010

(54) SPOOLING DURING VIDEO FORMAT CONVERSIONS

(75) Inventors: Ken K. Lin, Redwood City, CA (US); Kelly M. Hawk, San Francisco, CA (US); Vaidyanath Mani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1161 days.

(21) Appl. No.: 11/033,061

(22) Filed: Jan. 7, 2005

(51) Int. Cl.
*H04N 7/12* (2006.01)
(52) U.S. Cl. .............. 375/240.01; 375/240.25; 375/240.26
(58) Field of Classification Search ............ 375/240.25, 375/240.26
See application file for complete search history.

(56) References Cited

U.S. PATENT DOCUMENTS

| 6,449,392 | B1 * | 9/2002 | Divakaran et al. ............ 382/235 |
| 6,658,056 | B1 * | 12/2003 | Duruoz et al. ............... 375/240 |
| 6,728,317 | B1 * | 4/2004 | Demos .................. 375/240.21 |
| 7,148,908 | B2 * | 12/2006 | Riek et al. .................. 345/646 |
| 7,212,574 | B2 * | 5/2007 | Abrams et al. ......... 375/240.25 |

\* cited by examiner

*Primary Examiner*—Andy S. Rao
*Assistant Examiner*—Geepy Pe
(74) *Attorney, Agent, or Firm*—Hickman Palermo Truong & Becker LLP

(57) ABSTRACT

Techniques are provided which allow computers with relatively less computational power to perform dynamic conversion of video from inter-frame dependent format to an independent-frame format while playing the video as it is being converted. If the conversion operation is not keeping up with the arrival of the incoming video, the video is spooled within the computer system. The playback and conversion operations proceed as the spooling is performed. Thus, to a viewer of the video, the video may appear to slow, but the playback and conversion operation proceed without losing frames.

16 Claims, 2 Drawing Sheets

SPOOLING DURING VIDEO FORMAT CONVERSIONS

FIELD OF THE INVENTION

The present invention relates to converting video from one format to another and, more specifically, converting video from an inter-frame compressed format to an independent-frame format (a format in which the video information is represented without inter-frame dependencies).

BACKGROUND

Frequently, to reduce the amount of storage and computation required by digital video, the digital video is captured in a format in which the video data is compressed using inter-frame compression. MPEG is an example of a format that uses inter-frame compression.

MPEG is a popular standard that has been developed for digitally storing audio-visual sequences and for supplying the digital data that represents the audio-visual sequences to a client. In the examples hereafter, MPEG is used as an example of an inter-frame compressed format. However, MPEG-1 and MPEG-2 are merely two examples of inter-framed compressed formats with which the techniques described hereafter may be applied. The techniques are not limited to any particular inter-frame compressed digital format.

In the MPEG format, video and audio information are stored in a binary file (an "MPEG file"). The video information within the MPEG file represents a sequence of video frames. This video information may be intermixed with audio information that represents one or more soundtracks. The amount of information used to represent a frame of video within the MPEG file varies greatly from frame to frame based both on the visual content of the frame and the technique used to digitally represent that content.

MPEG employs three general techniques for encoding frames of video. The three techniques produce three types of frame data: Intra-frame ("I-frame") data, Predicted frame ("P-frame") data and Bi-directional ("B-frame") data. I-frame data contains all of the information required to completely recreate a frame. P-frame data contains information that represents the difference between a frame and the frame that corresponds to the previous I-frame data or P-frame data. B-frame data contains information that represents relative movement between preceding I or P-frame data and succeeding I or P-frame data. These digital frame formats are described in detail in the following international standards: ISO/IEC 13818-1, 2, 3 (MPEG-2) and ISO/IEC 11172-1, 2, 3 (MPEG-1). Documents that describe these standards (hereafter referred to as the "MPEG specifications") are available from ISO/IEC Copyright Office Case Postale 56, CH 1211, Genève 20, Switzerland.

As explained above, video frames cannot be created from P and B-frame data alone. To recreate video frames represented in P-frame data, the preceding I or P-frame data is required. Thus, a P-frame can be said to "depend on" the preceding I or P-frame. To recreate video frames represented in B-frame data, the preceding I or P-frame data and the succeeding I or P-frame data are required. Thus, B-frames can be said to depend on the preceding and succeeding I or P-frames.

Inter-frame compressed formats present a problem to video editors, because the removal or editing of one frame may affect or render unintelligible one or more other frames. Therefore, as a preliminary task before editing a video encoded in an inter-frame compressed format, the video is converted to a format in which the inter-frame dependencies are removed. For example, an MPEG encoded video may be converted to a format in which each frame is represented by a JPEG image whose content does not depend on the content of any other frame. Formats in which the inter-frame dependencies have been removed are referred to herein as independent-frame formats. Once in independent-frame format, a video may be edited without worry of creating problems related to dependencies between frames.

While a video is being converted from an inter-frame compressed format to an independent-frame format, it is often desirable to display the video that is being converted. Unfortunately, the overhead associated with converting and playing the video is such that many older computer systems are incapable of keeping up with the incoming video stream. This is particularly true if the video being converted is a high definition video that is being streamed to an older computer over a fast I/O connection. For example, a relatively older computer may not have the computational power necessary to convert an HDV stream, a format based on MPEG-2 transport stream with high definition MPEG-2 video and MPEG-1 layer 2 audio, as it arrives over a FireWire connection from an HDV camera.

As used herein, the term "high definition video" refers to any video format with higher resolution or frame rate than standard definition. For example, a frame dimension of 720× 480 at 60 frames per second is high definition because it has a higher frame rate than NTSC. Most common high definition formats are 1280×720 at 60 frames per second and 1920× 1080 at 60 fields (30 interlaced frames) per second. HDV is an example of one format that carries high definition video.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided which allow computers with relatively less computational power to perform dynamic conversion of video from inter-frame dependent format to an independent-frame format while playing the video as it is being converted. According to one embodiment, if the conversion operation is not keeping up with the arrival of the incoming video, the video is spooled within the computer system. Initially, volatile memory is used to spool the incoming video. However, if the amount of incoming video that needs to be spooled exceeds a predetermined threshold, the incoming video is spooled to non-volatile memory, such as a hard drive. The playback and conversion operations proceed as the spooling is performed. Thus, to a viewer of the video, the video may appear to slow, but the playback and conversion operation proceed without losing frame information.

System Overview

Figure 1:
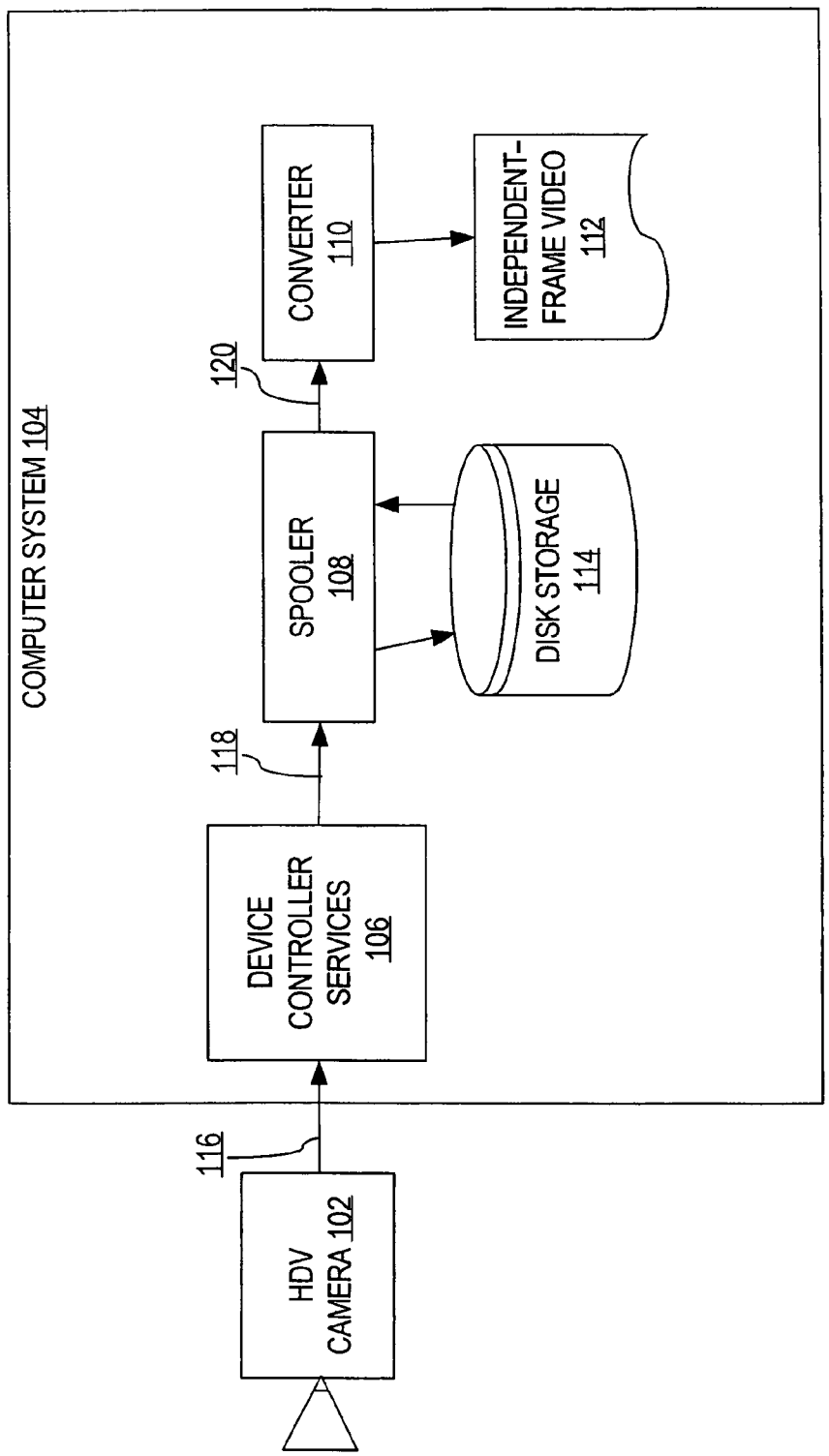
FIG. 1 is a block diagram of a system in which video data is spooled during an operation in which the video is being converted from an inter-frame compressed format to an independent frame format, according to an embodiment of the invention.

Referring to FIG. 1, it is a block diagram of a system for transcoding video according to an embodiment of the invention. In the embodiment illustrated in FIG. 1, an HDV camera 102 sends digital video to a computer system 104 over a connection 116. Connection 116 may be, for example a FireWire connection. The video stream that is sent over connection 116 to computer system 104 is in an inter-frame compressed format, such as MPEG-2. Typically, the video stream is delivered at the same rate that it was captured. Thus, ten minutes of video is transferred to computer 104 in ten minutes.

Within computer system 104, the video is processed by device controller services 106 and sent to spooler 108. The specific processing that is performed by device controller services 106 will be described in greater detail below. However, the video stream that is output by device controller services 106 continues to be in an inter-frame compressed format.

Converter 110 converts the inter-frame compressed video to independent-frame video. If the rate at which converter 110 is performing the conversion is keeping up with the rate at which the inter-frame compressed video is arriving, then spooler 108 merely forwards via 120 the data of the inter-frame compressed video received from device controller services 106 via 118 to converter 110. However, if converter 110 is not able to convert the incoming video at the rate that the incoming video is arriving, then spooler 108 spools the inter-frame compressed video data to memory. According to one embodiment, the spooler 108 first spools the inter-frame compressed video data to volatile memory. If the amount of volatile memory used to spool the inter-frame compressed video exceeds a certain threshold, then spooler 108 begins to spool newly incoming video data to disk storage 114.

If spooler 108 has spooled some of the video data, then when converter 110 becomes available to convert more video, spooler 108 provides converter 110 with the oldest not-yet converted video information from memory. If the oldest not-yet converted video is provided from volatile memory, then a portion of the volatile memory becomes free to store more incoming video. If some of the video data has been spooled to disk storage 114, then the oldest not-yet-converted video data on disk storage 114 is loaded into volatile memory and forwarded via 120 to converter 110.

The output produced by converter 110 is a video file in which the incoming video is stored in an independent-frame video format 112. Because the rate at which spooler 108 feeds converter 110 the video information is based on the rate at which converter 110 is converting the video (and not on the rate at which the video is being received from the HDV camera 102), the conversion operation will be successful even though computer system 104 does not have the computational power to convert at the rate that the video is being received.

Device Controller Services

According to one embodiment, device controller services 106 receives a video stream encoded in a inter-frame compression format from a video source, such as HDV camera 102. The video stream may be received, for example, using the HDV Transport Stream Format at approximately 19 megabits per second (for 720p video) or approximately 25 megabits per second (for 1080i video). The inter-frame compression format may be, for example, MPEG2 Video with MPEG1 layer 2 audio, where the audio and video are multiplexed.

Device controller services 106 identifies the type of device that is the source of the video data by reading the configuration ROM of the device. The configuration ROM may indicate, for example, the vendor and serial number of the device. Based on this and other information from the configuration ROM, the device controller services 106 determines which command sets are supported by the device, and issues commands to the device from the appropriate command set. By issuing such commands, the device controller services 106 may determine what type of data the device produces, the format of the data, and the protocol for transferring the data. Device controller services 106 may then expose this information to applications running on computer system 104. The applications, in turn, may make calls to the device controller services 106 to control the devices with which they are designed to operate.

In the example illustrated in FIG. 1, device controller services 106 provides AVCCommand device control, and delivers HDV data in discrete packets to spooler 108. The discrete packets may either be MPEG-2 transport stream packets, or demultiplexed into elementary audio and video streams. According to one embodiment, device controller services 106 insulates computer system 104 from the complexities of different device control systems, but not from different video formats. Specifically, device controller services 106 makes all cameras look alike as far as play/rewind/fast-forward/pause/record operations are concerned, but once a video stream begins to flow from the camera to computer system 104, computer system 104 must then deal with the specifics of the video format the camera is providing, which can vary from camera to camera.

The Converter

As mentioned above, converter 110 converts video from inter-frame compressed format into an independent-frame format. While spooler 108 and converter 110 are shown separately in FIG. 1 for the purpose of explanation, spooler 108 may be incorporated into converter 110 to produce a spooling converter.

According to one embodiment, converter 110 sends the video stream to a playback device, so that the user may see the progress of the conversion operation. If the video is also being played back on the HDV camera 102, and converter 110 cannot keep up with the incoming video stream, then the video being played back on the display device associated with computer system 104 will lag behind the video being played back on the HDV camera. However, the playback device associated with computer system 104 will eventually play the entire video, and the conversion operation will not be adversely affected (e.g. no frames will be lost) by converter 110's inability to keep up.

Controlling the Capture and Conversion

According to one embodiment, the user is presented with user interface controls that affect the capture and/or conversion operations. For example, the user may be provided a user interface control for pausing or stopping the receipt of video from the HDV camera 102. However, even if the receipt of the video stream is paused, the conversion and playback operations may continue based on already-received video data that has been spooled.

Once the user has stopped the video stream, a dialog box may be presented where they can either wait for the spooler 108 to finish processing the stream, or stop processing and keep only the independent-frame video created so far. The user has a choice, at any point while the video stream is playing on the camera, about whether to write the converted independent-frame video to a file. If the user chooses only to watch the video on their computer screen, certain computational operations are skipped. Using the user interface controls mentioned above, the user can stop and start recording to a file.

The user may also be presented with a dialog box once the entire video stream has been received. The dialog box may ask the user if the user wishes to continue performing the playback and conversion operation, until all of the spooled video data has been processed.

Hardware Overview

Figure 2:
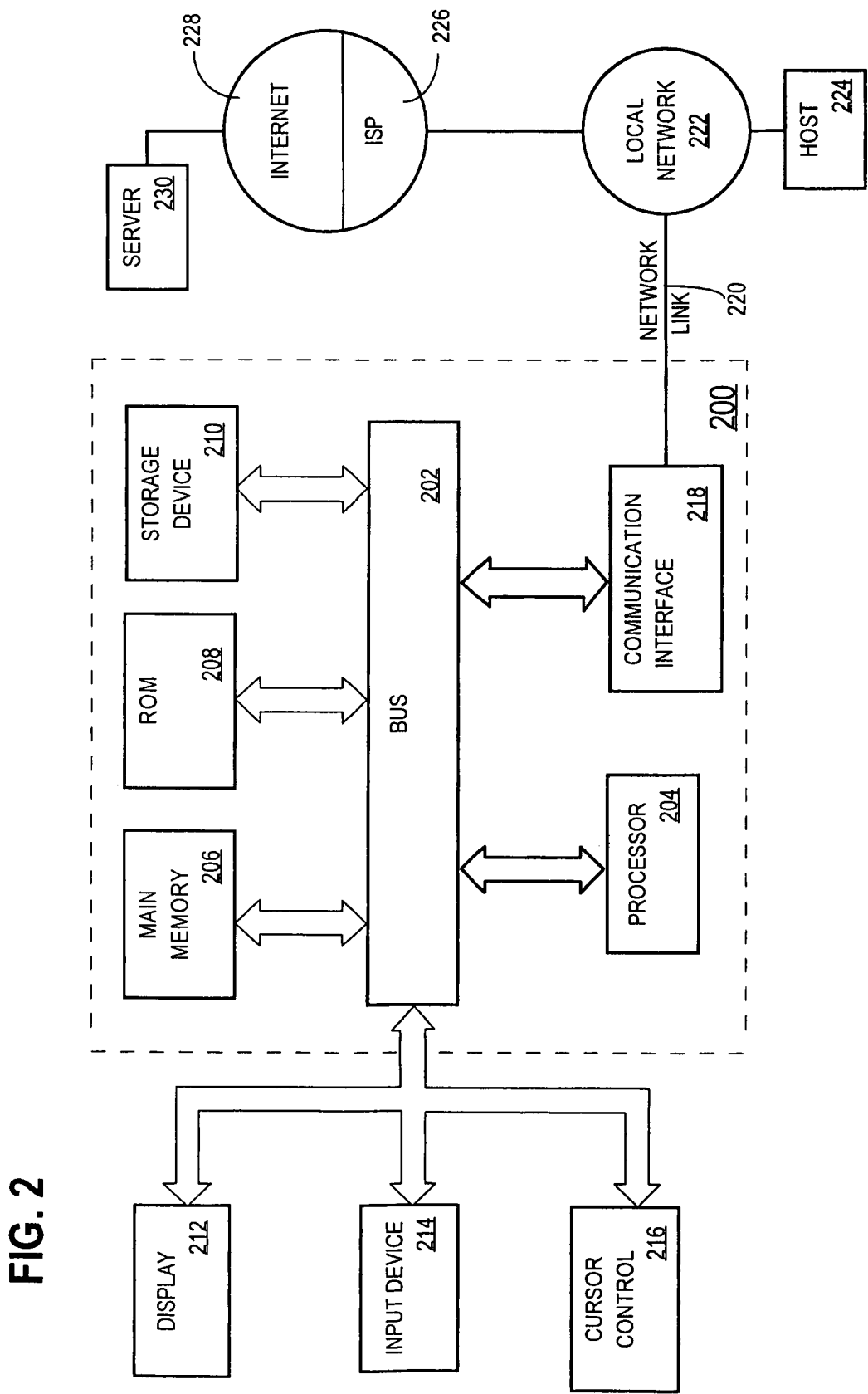
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, and volatile media. Non-volatile media includes, for example, optical or magnetic disks, such as storage device 210. Volatile media includes dynamic memory, such as main memory 206.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for converting video, the method comprising:
   receiving, as input to a spooler, at a first rate, video data that is in an inter-frame compressed format;
   converting output from the spooler, by a converter, at a second rate;
   wherein converting output from the spooler includes converting the video data that is output from the spooler from the inter-frame compressed format to an independent-frame format; and
   in response to detecting that the first rate exceeds the second rate, the spooler spooling, in the inter-frame compressed format, the video data that is received by the spooler in the inter-frame compressed format;
   wherein frames input to the spooler at the first rate are the same frames, in number, content and format, that are output from the spooler at the second rate;
   wherein the amount of video data that is being spooled by the spooler varies over time based on changes to at least one of the first rate and the second rate;
   wherein a rate of change of the amount of video data that is being spooled by the spooler varies over time based on a difference between the first rate and the second rate;
   wherein the spooler spools the video data while the converter continues to convert the video data that is output from the spooler to the independent-frame format at the second rate;
   wherein the spooler does not affect the video data in the inter-frame compressed format;
   wherein the steps of receiving, converting and spooling are performed by one or more computing devices.

2. The method of claim 1 wherein the step of spooling includes:
   spooling the video data to volatile memory until the amount of video data spooled to volatile memory exceeds a threshold; and
   when the video data spooled to volatile memory exceeds the threshold, spooling the video data to non-volatile memory.

3. The method of claim 1 further comprising, while the video data is being converted at the second rate, displaying, at the second rate, the video that is represented by the video data that is being converted.

4. The method of claim 1 wherein:
   the steps of receiving and converting are performed by a computer system; and
   the computer system performs the step of converting as the computer system receives the video data from an external device.

5. The method of claim 4 wherein the video data is high definition video transferred to the computer system over a FireWire connection.

6. The method of claim 1 wherein the step of converting produces an independent-frame video file in which individual frames may be edited without affecting other frames of the video.

7. A computer-readable storage medium encoded with a computer program having instructions which, when executed by one or more processors, causes the one or more processors to perform the method recited in claim 1.

8. A computer-readable storage medium encoded with a computer program having instructions which, when executed by one or more processors, causes the one or more processors to perform the method recited in claim 2.

9. A computer-readable storage medium encoded with a computer program having instructions which, when executed by one or more processors, causes the one or more processors to perform the method recited in claim 3.

10. A computer-readable storage medium encoded with a computer program having instructions which, when executed by one or more processors, causes the one or more processors to perform the method recited in claim 4.

11. A computer-readable storage medium encoded with a computer program having instructions which, when executed by one or more processors, causes the one or more processors to perform the method recited in claim 5.

12. A computer-readable storage medium encoded with a computer program having instructions which, when executed by one or more processors, causes the one or more processors to perform the method recited in claim 6.

13. A method for converting video, the method comprising:
   receiving, as input to a spooler, at a first rate, video data that is in a first format;
   within a computing device, converting output from the spooler, by a converter, at a second rate;
   wherein converting output from the spooler includes converting the video data that is output from the spooler from the first format to a second format;
   wherein frames input to the spooler at the first rate are the same frames, in number, content and format, that are output from the spooler at the second rate;
   wherein the amount of video data that is being spooled by the spooler varies over time based on changes to at least one of the first rate and the second rate;
   wherein a rate of change of the amount of video data that is being spooled by the spooler varies over time based on a difference between the first rate and the second rate;
   wherein said computing device does not have sufficient computational power to convert the video data at the first rate;
   while the video data is being converted at the second rate, displaying on a display associated with the computing device, at the second rate, the video that is represented by the video data that is being converted; and in response to detecting that the first rate exceeds the second rate, the spooler spooling the video data that is in first format while the converter continues to convert the video data output from the spooler to the second format at the second rate;

wherein the steps of receiving, converting and spooling are performed by one or more computing devices.

14. The method of claim 13 wherein the step of spooling includes:

spooling the video data to volatile memory until the amount of video data spooled to volatile memory exceeds a threshold; and when the video data spooled to volatile memory exceeds the threshold, spooling the video data to non-volatile memory.

15. A computer-readable storage medium encoded with a computer program having instructions which, when executed by one or more processors, causes the one or more processors to perform the method recited in claim 13.

16. A computer-readable storage medium encoded with a computer program having instructions which, when executed by one or more processors, causes the one or more processors to perform the method recited in claim 14.

* * * * *